(12) United States Patent
Harrison et al.

(10) Patent No.: US 8,458,766 B2
(45) Date of Patent: Jun. 4, 2013

(54) METHOD AND SYSTEM FOR MANAGEMENT OF SECURITY RULE SET

(75) Inventors: Reuven Harrison, Tel Aviv (IL); Michael Hamelin, Suwanee, GA (US)

(73) Assignee: Tufin Software Technologies Ltd., Ramat Gan (IL)

( * ) Notice: Subject to any disclaimer, the term of this patent is extended or adjusted under 35 U.S.C. 154(b) by 260 days.

(21) Appl. No.: 12/781,352

(22) Filed: May 17, 2010

(65) Prior Publication Data

US 2010/0299741 A1    Nov. 25, 2010

Related U.S. Application Data

(60) Provisional application No. 61/179,089, filed on May 18, 2009.

(51) Int. Cl.
*G06F 21/00*    (2006.01)

(52) U.S. Cl.
USPC ............................................................ 726/1

(58) Field of Classification Search
USPC ................................. 726/12, 1; 713/100, 153
See application file for complete search history.

(56) References Cited

U.S. PATENT DOCUMENTS

| | | | |
|---|---|---|---|
| 6,098,172 A | 8/2000 | Coss et al. | |
| 6,484,261 B1 | 11/2002 | Wiegel | |
| 6,826,698 B1 | 11/2004 | Minkin et al. | |
| 7,032,022 B1 | 4/2006 | Shanumgam et al. | |
| 2003/0212657 A1 | 11/2003 | Kaluskar et al. | |
| 2007/0094707 A1 | 4/2007 | Karch | |
| 2008/0172347 A1* | 7/2008 | Bernoth et al. | 706/12 |
| 2008/0172731 A1* | 7/2008 | Aaron | 726/13 |
| 2008/0215518 A1 | 9/2008 | Matsuda | |
| 2008/0282313 A1 | 11/2008 | Diaz-Cuellar et al. | |
| 2008/0282336 A1* | 11/2008 | Diaz Cuellar et al. | 726/11 |
| 2010/0011433 A1 | 1/2010 | Harrison et al. | |

* cited by examiner

*Primary Examiner* — Ellen Tran
(74) *Attorney, Agent, or Firm* — Oliff & Berridge, PLC

(57) ABSTRACT

There are provided a method of automated managing an ordered set of security rules implemented at one or more security gateways and a system thereof. The method comprises a) obtaining data characterizing a connectivity request which may become allowable only upon changes of an initial rule-set, thus giving rise to an unfitting connectivity request; b) automated searching for a rule within said ordered set of security rules, said rule best matching to be amended in order to facilitate allowance of the unfitting connectivity request, wherein best matching is defined in accordance with one or more predefined criteria; c) automated generating amendment of the best matching rule, said amendment capable to facilitate allowance of the unfitting connectivity request; and d) automated implementing the generated amendment at one or more relevant security gateways among said one or more security gateways. At least one predefined criterion may be related to extra allowed traffic resulting from the amendment and/or to requested traffic restricted after amendment because of shadowing by one or more rules above the amended rule.

24 Claims, 6 Drawing Sheets

METHOD AND SYSTEM FOR MANAGEMENT OF SECURITY RULE SET

This application relates to and claims priority from U.S. Provisional Patent Application No. 61/179,089 filed on May 18, 2009 incorporated herein by reference in its entirety.

FIELD OF THE INVENTION

This invention generally relates to network security, and more particularly, to methods and systems capable of managing a security rule set.

BACKGROUND OF THE INVENTION

Today, information security is one of the critical concerns in computer networks and services. Various methods have been developed for protection of various resources and services; usually these methods include implementation of one or more security policies, combinations and hierarchies thereof. Typically, a security policy implemented in a respective rule-set includes control of inbound and outbound traffic related to certain resources. Such control is enforced with the help of one or more security gateways, which may comprise various devices and/or combinations thereof (e.g. switches, routers, firewalls, VPN devices, load balancers, etc.)

However, maintaining the security rule-set, especially in complex network architecture, presents an increasing challenge to security departments worldwide. The problems of a security rule-set management have been recognized in the Prior Art and various systems have been developed to provide a solution as, for example:

U.S. Pat. No. 6,098,172 (Coss et al.) discloses a firewall supporting multiple security policies and/or multiple users by applying any one of several distinct sets of access rules. The firewall can also be configured to utilize "stateful" packet filtering which involves caching rule processing results for one or more packets, and then utilizing the cached results to bypass rule processing for subsequent similar packets. Dynamic rules may be used in addition to pre-loaded access rules in order to simplify rule processing.

U.S. Pat. No. 6,826,698 (Minkin et al.) discloses a system, method and computer program product for affording network security features. The method includes: identifying a plurality of network objects; retrieving rule sets associated with at least one of the identified network objects, the rule sets including a plurality of policy rules that govern actions relating to the identified network objects; reconciling overlapping policy rules of the rule sets amongst the network objects; and executing the reconciled rule sets.

US Patent Application No. 2003/212657 (Lu et al.) discloses an extensible rules engine that uses database technology which provides a rules evaluation service for applications external to the database server or database management system. Applications are able to utilize the rules engine to provide alternative behaviors based on information against which specified conditions are evaluated. A framework is provided for specifying data definitions that can be referenced by user-defined rules, through creation and use of an evaluation context. Application-specific data types can be defined by specifying data tables and/or variables that can be referenced by rules created for evaluation against data that is associated with the evaluation context.

US Patent Application 2007/094707 (Karch) discloses a rules based system enforcing security policies in a data access management system. The rules based system provides rules that preclude certain activities, but those rules are only implemented and fired upon certain conditions occurring. This results in certain actions being precluded when specified conditions are true, without additional software required to check for the condition each time the action is requested.

US Patent Application No. 2008/215518 (Matsuda) discloses a filtering rule analysis system for analyzing the rules of a packet filtering process that is set in network devices. The system includes: a rule storage for storing sets of rules for which an order of priority has been established; a matrix generator for generating matrix spatial data that contains information of the order of priority and that indicates the correspondence relation between a minimum region identified by starting points and end points of ranges of packet attributes described in each rule as the condition of application of that rule and those rules; and an overlap analyzer for referring to the matrix spatial data to analyze overlap between the rules.

US Patent Application No. 2008/282313 (Diez-Cuellar et al.) discloses a computer-readable medium having a data structure stored thereon for defining a schema for expressing a network security policy. The data structure includes a first data field including data defining a parameter to be applied based on the network security policy. The network security policy defines at least one of the following: a firewall rule and a connection security rule. The data structure also includes a second data field having data specifying restrictions of the parameter included in the first data field. The parameter in the first data field and the restrictions in the second data field form the schema for expressing the network security policy to be processed. The network security policy manages communications between a computing device and at least one other computing device.

US Patent Application No. 2010/011433 (Harrison et al.) discloses a rule-set generator and a method of automated configuration of a security gateway. The method comprises setting-up an initial rule-set; obtaining log records of communication events corresponding to the initial rule-set so as to obtain a sufficient amount of log records; transforming the obtained log records into respective rules, wherein source, destination and service fields in each rule correspond to source, destination and service values in respective obtained log record, and the action in all rules is defined as "Accept", thus giving rise to a transformation-based rule-set; and processing the transformation-based rule-set so as to generate an operable rule-set by processing the transformation-based rule-set.

SUMMARY OF THE INVENTION

In accordance with one aspect of the subject matter of the present application, there is provided a method of automated managing an ordered set of security rules implemented at one or more security gateways. The method comprises: a) obtaining data characterizing a connectivity request which may become allowable only upon changes of an initial rule-set, thus giving rise to an unfitting connectivity request; b) automated searching for a rule within said ordered set of security rules, said rule best matching to be amended in order to facilitate allowance of the unfitting connectivity request, wherein best matching is defined in accordance with one or more predefined criteria; c) automated generating amendment of the best matching rule, said amendment capable to facilitate allowance of the unfitting connectivity request; and d) automated implementing the generated amendment at one or more relevant security gateways among said one or more security gateways, thus giving rise to an amended rule-set.

In accordance with other aspect of the subject matter of the present application, there is provided a system capable of automated managing an ordered set of security rules implemented at one or more security gateways. The system comprises: a) means for obtaining data characterizing a connectivity request which may become allowable only upon changes of an initial rule-set, thus giving rise to an unfitting connectivity request; b) means for automated searching for a rule within said ordered set of security rules, said rule best matching to be amended in order to facilitate allowance of the unfitting connectivity request, wherein best matching is defined in accordance with one or more predefined criteria; c) means for automated generating amendment of the best matching rule, said amendment capable to facilitate allowance of the unfitting connectivity request; and d) means for automated implementing the generated amendment at one or more relevant security gateways among said one or more security gateways, thus giving rise to an amended rule-set.

In accordance with further aspects of the subject matter of the present application, at least one predefined criterion is related to extra allowed traffic resulting from the amendment and/or to requested traffic restricted after amendment by one or more rules above the amended rule.

In accordance with further aspects of the subject matter of the present application, at least one predefined criterion is selected from a group comprising: a) criterion characterizing a relation between allowed traffic in the amended rule-set and traffic allowed in the initial rule-set; b) criterion characterizing a relation between entire added traffic and traffic which needs to be added in accordance with the unfitting connectivity request; c) criterion characterizing a relation between requested traffic rejected resulting from amendment and requested traffic allowed resulting from amendment; d) criterion characterizing a relation between requested traffic rejected resulting from amendment and entire requested traffic.

In accordance with further aspects of the subject matter of the present application, the rule is considered as best matching if it fits at least one of said criteria and/or combination thereof.

In accordance with further aspects of the subject matter of the present application, the method may further comprise (and the system may further enable) automated searching for a plurality of rules enabling a predefined range of at least one of said criteria, and selecting the best matching rule among them. Alternatively or additionally, the method may further comprise automated searching, for each said criterion, at least one rule enabling the minimal value of respective criterion, and selecting the best matching rules among them.

In accordance with further aspects of the subject matter of the present application, searching for the best matching rule may comprise selecting a plurality of rules matching certain predefined conditions, and enabling a user to select the best matching rule among said plurality of rules.

In accordance with further aspects of the subject matter of the present application, the method may further comprise (and the system may further enable): a) obtaining a plurality of unfitting connectivity requests, b) generating respective amendments to each request among said plurality of unfitting connectivity requests, c) queuing the generated amendments; and d) implementing the generated amendments during a certain service window.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "modifying", "calculating", "determining", "generating", "configuring", "searching", "finding", or the like, refer to the action and/or processes of a computer that manipulate and/or transform data into other data, said data represented as physical, such as electronic, quantities and/or represent one or more physical objects. The term "computer" should be expansively construed to cover any kind of electronic device with data processing capabilities, including, by way of non-limiting example, storage system disclosed in the present applications.

The operations in accordance with the teachings herein may be performed by a computer specially constructed for the desired purposes or by a general purpose computer specially configured for the desired purpose by a computer program stored in a computer readable storage medium.

The term "criterion" used in this patent specification should be expansively construed to include any compound criterion, including, for example, several criteria and/or their logical combinations.

The references cited in the background teach many principles of security management that are applicable to the present invention. Therefore the full contents of these publications are incorporated by reference herein where appropriate for appropriate teachings of additional or alternative details, features and/or technical background.

Figure 1:
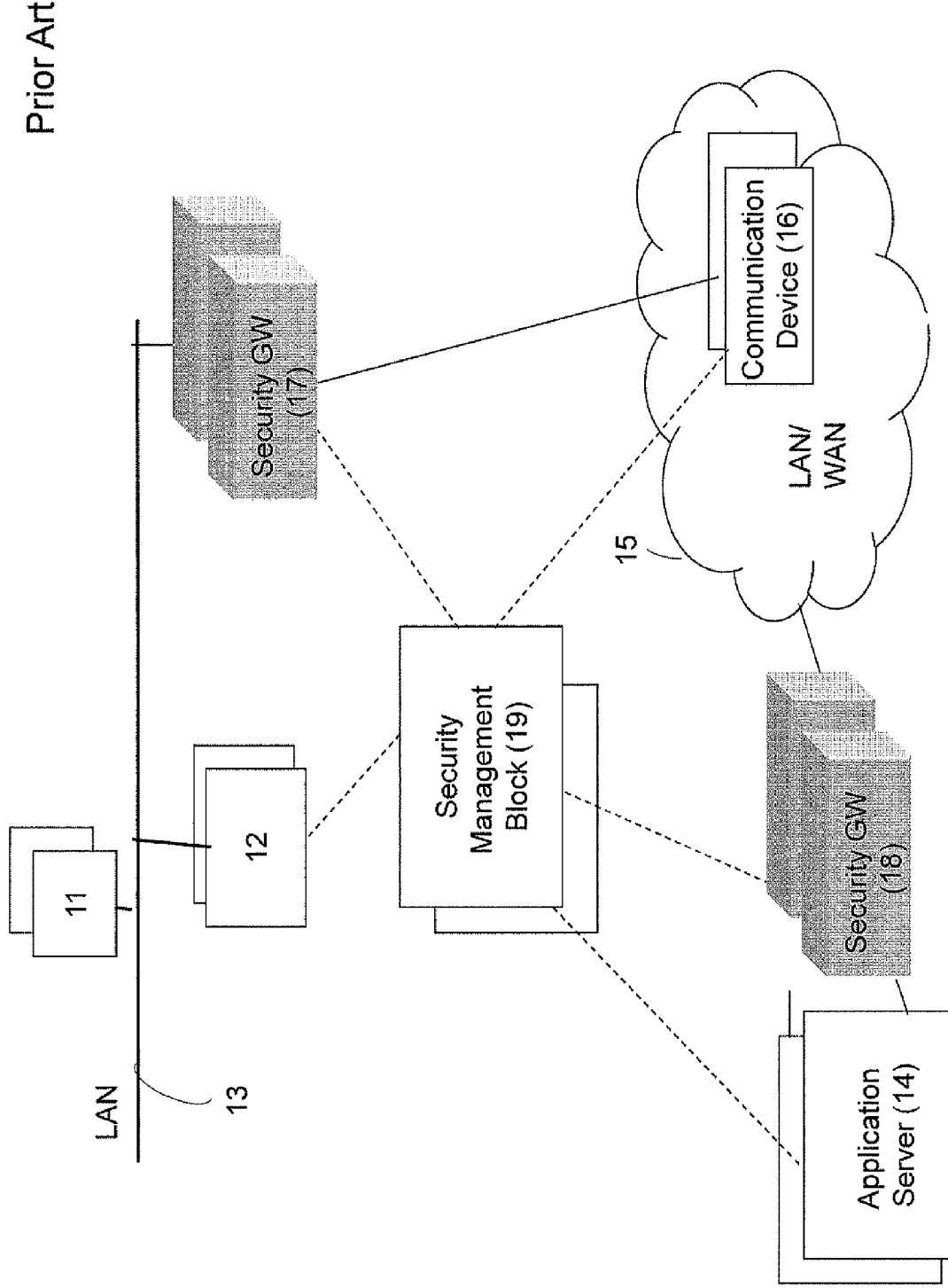
FIG. 1 illustrates a generalized network environment where the present invention may be implemented.

Bearing the above in mind, attention is drawn to FIG. 1 schematically illustrating an exemplary network environment wherein the present invention may be implemented. The network environment comprises a plurality of network resources, e.g. workstations 11 and/or servers 12, application servers 14 (and/or other not shown remote network resources as, for example, remote hosts, etc.). The network resources may be operatively connected via one or more local (13) and/or wide area (15) communication networks (including Internet). A communication network comprises one or more communication devices 16 (e.g. switches, routers, bridges, etc.) facilitating the data transfer. The network environment further comprises one or more security gateways. In the illustrated non-limiting example security gateway 17 is operatively connected to the private network 13 and to the wide area network 15 and controls inbound and outbound traffic related to the private network and resources thereof; security gateway 18 is operatively connected to the application servers 14 and to the wide area network 15 and controls the respective traffic. The security gateway may comprise, for example, one or more routers or firewalls with respective load balancers, intrusion detection/prevention systems, VPN devices and/or other equipment facilitating network and/or application security.

The security gateways operate in accordance with one or more rules controlling, at least, inbound and/or outbound traffic with regard to respective resources. These rules (including combinations and/or hierarchies thereof) are referred to hereinafter as a rule set. A single rule typically includes several fields (e.g. source (IP address and/or port), destination (IP address and/or port), service type, user, application, etc.), and an action which shall be drawn from the rule when a certain condition with regards to the field values is satisfied. The fields included in such condition(s) are referred to hereinafter as "fields engaged in the rules". The action in the rule may specify accepting or denying the respective traffic, authentication, encryption, etc. A field may be characterized by a specified set of values (e.g. a certain IP address, a certain range of TCP ports, a certain range of IP addresses in a LAN defined by a mask, any port, etc.)

The security gateways are operatively connected to a security management block 19. The security management block may be fully or partly integrated with one or more security gateways and/or with other network resources, or may be implemented in one or more stand-alone servers. The security management block functions may include providing a back-end for the policy editor GUI, monitoring the operation of the security gateways, storing the rule-set database and log database, reporting, etc.

Note that the invention is not bound by the specific architecture described with reference to FIG. 1. Those versed in the art will readily appreciate that the invention is, likewise, applicable to any network architecture facilitating protection of data network resources in accordance with a rule-set installed at any suitable security gateway capable of controlling the respective traffic. The teachings of the present invention are applicable to any suitable security gateway enforcing a rule-set controlling respective traffic.

Figure 2:
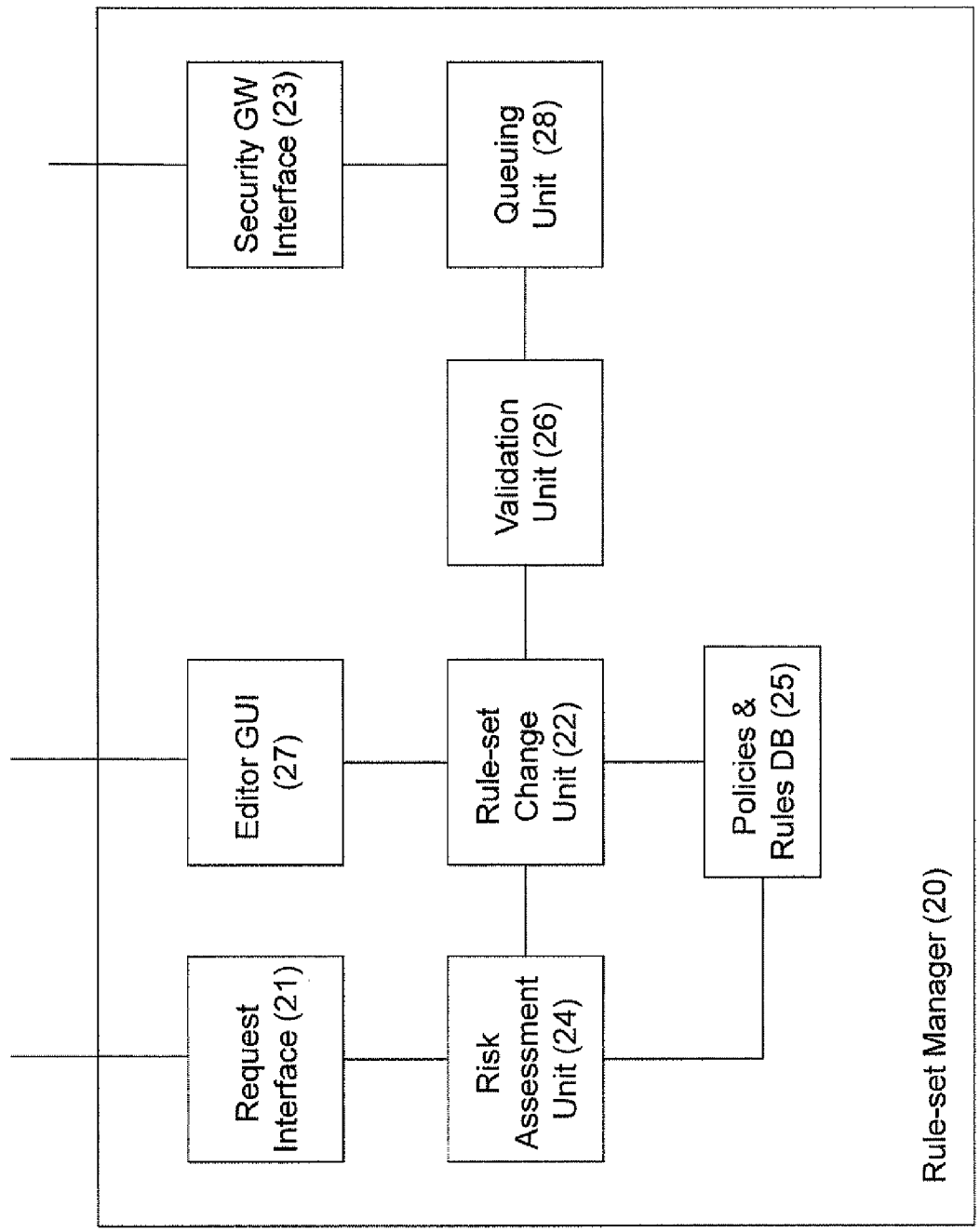
FIG. 2 illustrates a generalized functional diagram of a rule-set manager in accordance with certain embodiments of the present invention.

In accordance with certain embodiments of the invention, the security gateways and/or the security management block may be operatively connected to a rule-set manager 20 illustrated in FIG. 2. For purpose of illustration only, the following description is made with respect to security gateways at least partly integrated with security management block and storing the rule-set database. Those skilled in the art will readily appreciate that the teachings of the present invention are applicable in a similar manner to a rule-set database handled by a stand-alone security management block.

The rule-set manager comprises a request interface 21 configured to obtain data characterizing unfitting connectivity requests. Connectivity requests which may become accepted only upon changes of an initial rule-set (i.e. rule-set before required amendment) are referred to hereinafter as "unfitting requests". For purpose of illustration only, the following description is made with respect to acceptance of connectivity requests requesting allowance of certain traffic.

Those skilled in the art will readily appreciate that the teachings of the present invention are applicable in a similar manner to acceptance of connectivity requests alternatively or additionally requesting dropping of certain traffic or other actions.

The unfitting connectivity request may be received by the rule-set manager from a client (human user and/or application) for further analyses and respective rule-set amending. Alternatively, the rule-set manager may be configured to identify unfitting connectivity request among certain plurality of connectivity requests.

The request interface is operatively connected to a rule-set change unit 22. As will be further detailed with reference to FIGS. 3-5, the rule-set change unit is operable to process the obtained data characterizing a given unfitting connectivity request, generate amendments to the initial rule-set, and to provide the generated amendments to respective security gateway (and/or security management block) via a security gateway interface 23. Likewise, the generated amendments may be provided to another device involved in policy management or to an administrator.

Optionally, as will be further detailed with reference to FIG. 3, the rule-set manager may further comprise a risk assessment unit 24, validation unit 25, policies and rules database 26, editor GUI 27 and queuing unit 28 operatively connected to the rule-set change unit 22.

Those versed in the art will readily appreciate that the rule-set manager may be fully or partly integrated with the security gateway and/or the security management block and/or with other devices (e.g. communication devices, security devices, etc.), or may be implemented in one or more stand-alone servers.

Figure 3:
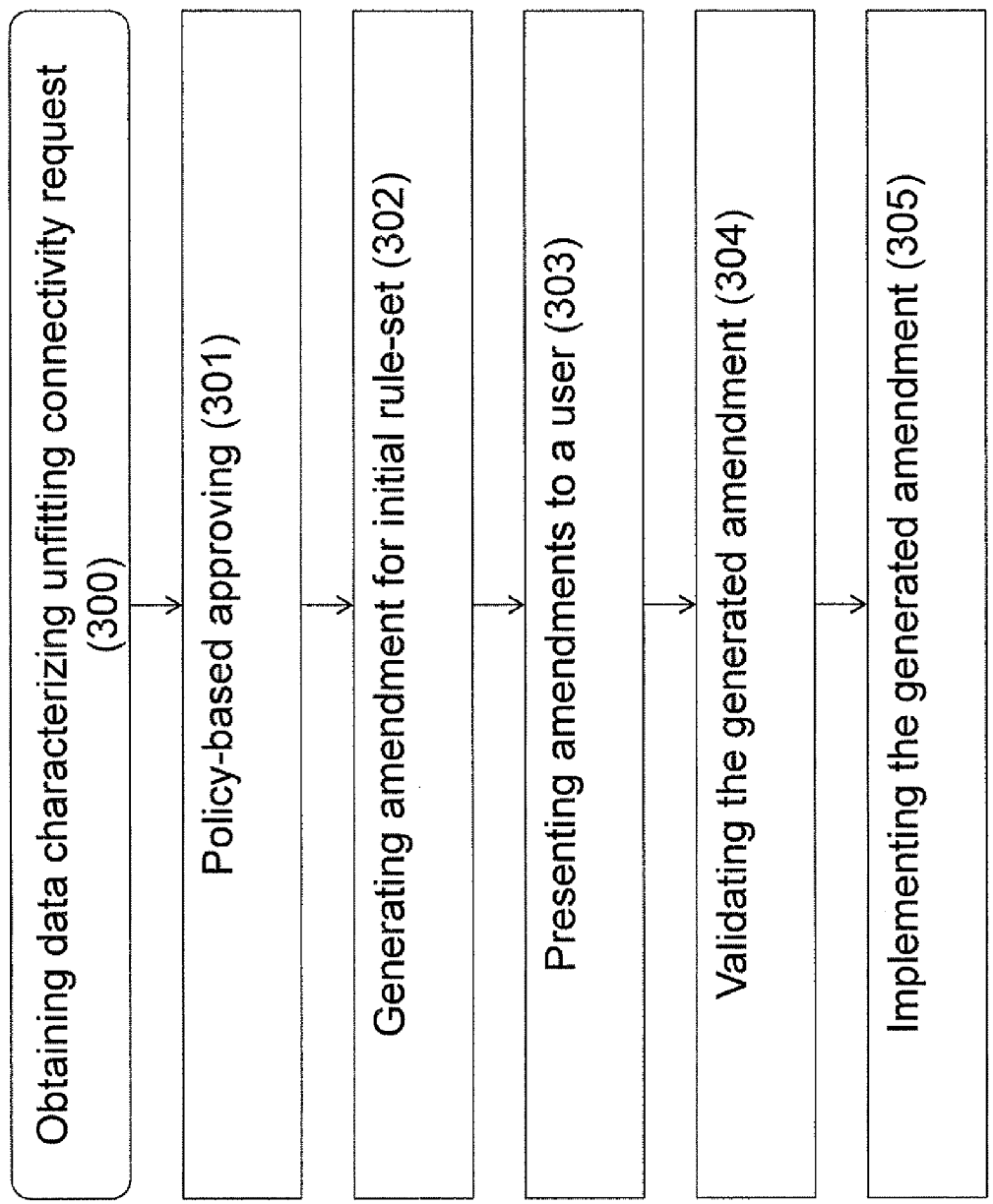
FIG. 3 illustrates a generalized flow diagram of automated amending an initial rule-set in accordance with certain embodiments of the present invention.

Referring to FIG. 3, there is illustrated a generalized flow chart of an automated amending initial rule-set in accordance with certain embodiments of the present invention. Responsive to obtaining (300) data characterizing an unfitting connectivity request, the rule-set manager generates (302) a rule-set amendment capable to facilitate allowance of the respective request. At least part of access requested in the unfitting connectivity request is not fully allowed. Accordingly, the unfitting connectivity request is characterized by at least one combination of values which does not match to respective value(s) specified in the fields engaged in respective rule(s) in the initial rule-set, for example source IP address or subnet, destination IP address or subnet, service or port, action (e.g. allow, drop, reject etc.), VPN and encryption requirements, time window(s) to enforce, authentication, allowable application, etc.

The connectivity request can be simple (for example: connect host A to host B) or more complex (e.g. request of multiple access paths). Optionally, complex connectivity request may be split into respective composites, and amending the initial rule-set may be provided separately for each composite.

Optionally, various approvals may be required before generating (302) amendment(s) for the initial rule-set. Approving (301) may be provided manually (by human) and/or automatically based on predefined settings, while some data may be extracted from the request or obtained from an external source.

When providing automated approval, the data characterizing unfitting connectivity request is run through the Risk Assessment Unit 24. The connectivity request is tested against various policies or databases such as, by way of non-limiting example, Destination security policies on target devices—if the connectivity requirement is explicitly denied, this may indicate a risk;

Risk policies—connections that pose a certain risk or zones that should not be connected;

Business continuity policies—connections that are essential and must not be broken;

Compliance policies—configurations which are to be avoided (for example, unencrypted protocols to PCI devices or the use of certain applications)

Best practices—configurations which are best performed in a certain way (for example, avoiding network object duplication);

Vulnerability databases—information concerning vulnerable assets that could be exposed by the requested connectivity change;

Malicious agents—information regarding hosts/users/applications or other entities that may acquire access by the requested connectivity change.

Policies can be manually configured, imported from other systems and/or learned from previous decisions. Policies may be handled in the security gateway and/or Policy and Rules Database 25 and/or otherwise.

Optionally, the results of risk assessment may be presented to a user who may decide to deny, approve or modify the request. Alternatively, the connectivity request may be approved or denied automatically based on the risk level and a predefined policy. The risk assessment results may also be used to dynamically decide how the request should be processed subsequently (for example: if and when an additional approval is required).

Data characterizing the approved connection request is sent to the rule-set change unit 22 operable to analyze the data and to generate rule-set amendments enabling allowance of the unfitting request. Operating the rule-set change unit is further detailed with reference to FIGS. 4-5. The rule-set change unit may obtain the initial rule-set from security gateway(s) and/or security management block via the security gateway interface 23. Additionally or alternatively, the initial rule-set may be handled in the policy & rules database 25 of the rule-set manager.

Optionally, the amendment generated by the rule-set change unit may be presented (303) to the user via the editor GUI 27 configured to enable the user to edit (and, optionally approve) the generated amendment(s).

The generated amendment (optionally upon completing the editing/approvals) is further validated by the validation unit 26 to verify that the amendment facilitates the connectivity request, and that inflicted changes of the initial rule-set are acceptable.

The generated amendment (optionally upon editing and validating) may be implemented (305) immediately or queued for the next service window and handled by the queuing unit 28. Queuing can be manual or automatic in accordance with predefined service windows and rules. The amendments may be implemented automatically through available APIs (for example OPSEC, command-line etc.), sent to an administrator for manual configuration of the amended rule set, or be implemented automatically with involvement of the administrator for certain approvals.

Optionally, in order to avoid possibly conflicting amendments, additional validation may be provided in a case of delay between generating one or more amendments and implementation thereof. For example, if the amendments are pushed out in bulk during a service window, there may be conflicts between amendments providing for different unfitting requests and/or other changes in the rule-set. In accordance with certain embodiments of the invention, validation of the bulk of amendment may be provided before implementation. Such validation may be provided periodically and/or in accordance with redefined events (e.g. after each new amendment in the bulk). Alternatively or additionally, the validation may be provided upon implementing the amendments in order to verify that the amended rule-set is fully authorized and consistent with the policy. If such a validation test fails, the rule-set manager may send out alerts and/or revert the change.

As will be further detailed with reference to FIG. 4, the rule-set manager may be further configured to support automated rule-set implementation in networks with multiple enforcement points.

In accordance with further aspects of the present invention, the enforcement of connectivity request may be provided for a certain time period. Accordingly, the generated amendment may include relevant time restriction data and/or the rule-set manager may be further configured to generate a request disabling or removing rule-set amendments when they are no longer needed and/or to notify the administrator accordingly.

Figure 4:
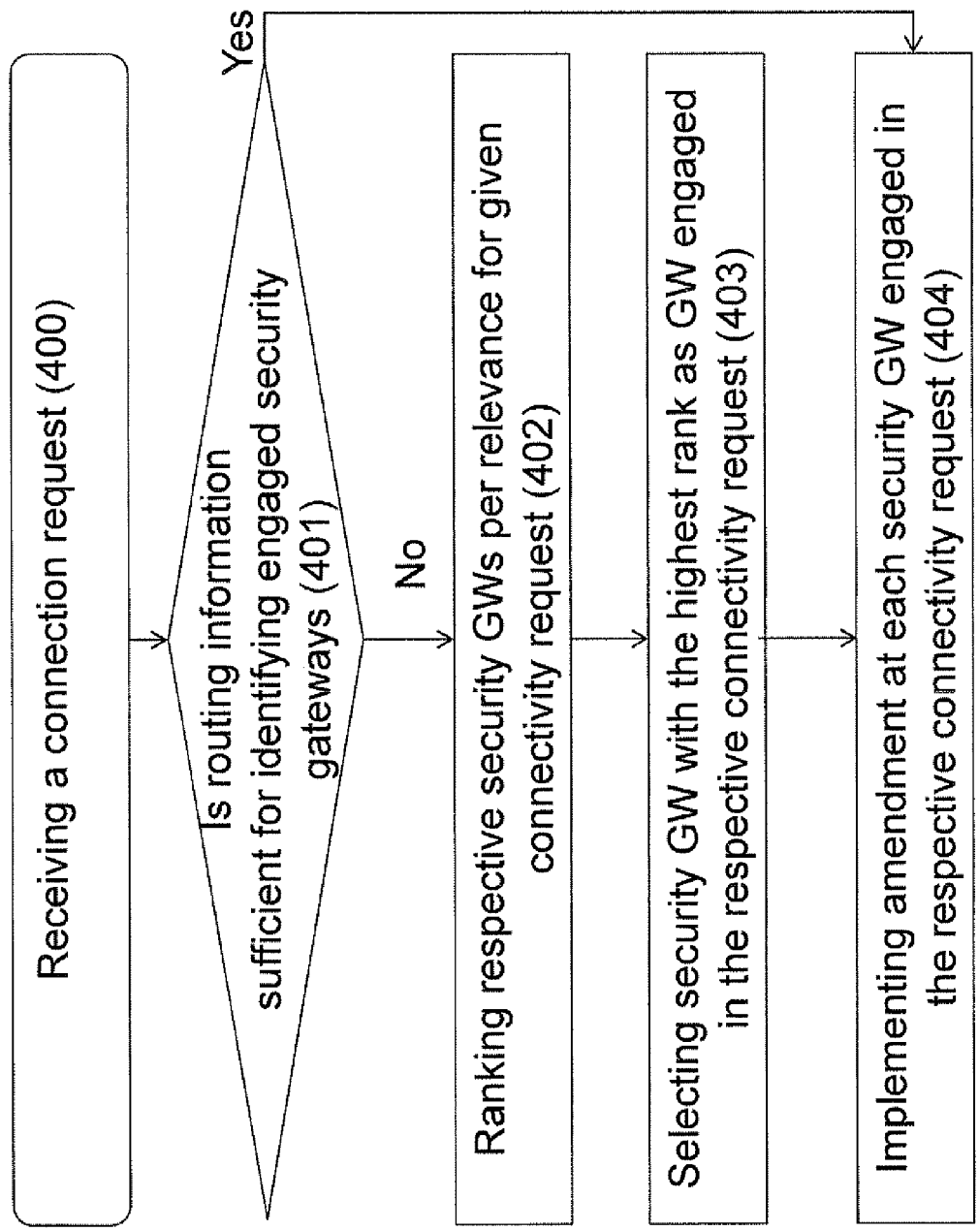
FIG. 4 illustrates a generalized flow diagram of selecting enforcement points in accordance with certain embodiments of the present invention.

Referring to FIG. 4, there is illustrated a generalized flow diagram of automated selecting one or more security gateways corresponding to the received (400) connectivity request. In accordance with certain embodiments of the present invention, the rule-set manager is capable to select one or more security gateways to serve as enforcement points for a given connectivity request. The rule-set manager is configured to learn network routing configuration through the security management block and/or directly from the security gateways; and to detect network segments with non-overlapping IP addresses and/or network segments established for administrative needs. The rule-set manager is further configured to analyze routing information (e.g. source and destination addresses) characterizing the given connectivity request and, accordingly, to identify in each network segment all respectively engaged security gateways. In a case of NAT (which is generally used to allow networks with conflicting IPs to interoperate), the rule-set manager may use NAT policies when defining the engaged security gateways.

The rule-set manager checks (401) if routing information characterizing unfitting connectivity request is sufficient for identifying the engaged security gateways, and further implements (404) the amendment at each security gateway engaged in the given connectivity request. In some cases routing information may be insufficient to unequivocally select the engaged security gateways (e.g. if the required connection may be implemented via multiple paths, if routes need to be added or changed too as a part of the respective amendment, etc.) In accordance with certain embodiments of the present invention, if routing information is insufficient, the rule-set manager may notify an administrator about a need to select the proper security gateway. Alternatively or additionally, the rule-set manager may recognize possibly engaged security gateways and rank (402) them according to their relevance to the connectivity request. By way of non-limiting example, the recognition may be provided by analyzing a topology graph characterizing the security gateways. The ranking may be provided in accordance with at least one of the following criteria:

whether the source and destination specified in the connectivity request are routed on the same interface of the security gateway;

whether the source and destination specified in the connectivity request are routed on the same routing entry of the routing table of respective security gateway;

whether the source and destination specified in the connectivity request are directly connected;

whether the source and destination specified in the connectivity request are explicitly routable or they are routable through a default gateway.

For example, an explicit route for either source or destination may be ranked as a better match than the default route.

The rule-set manager is further configured to select (403) security gateway with the highest rank as a gateway engaged in the respective connectivity request and to implement (402) the generated amendment accordingly.

Figure 5:
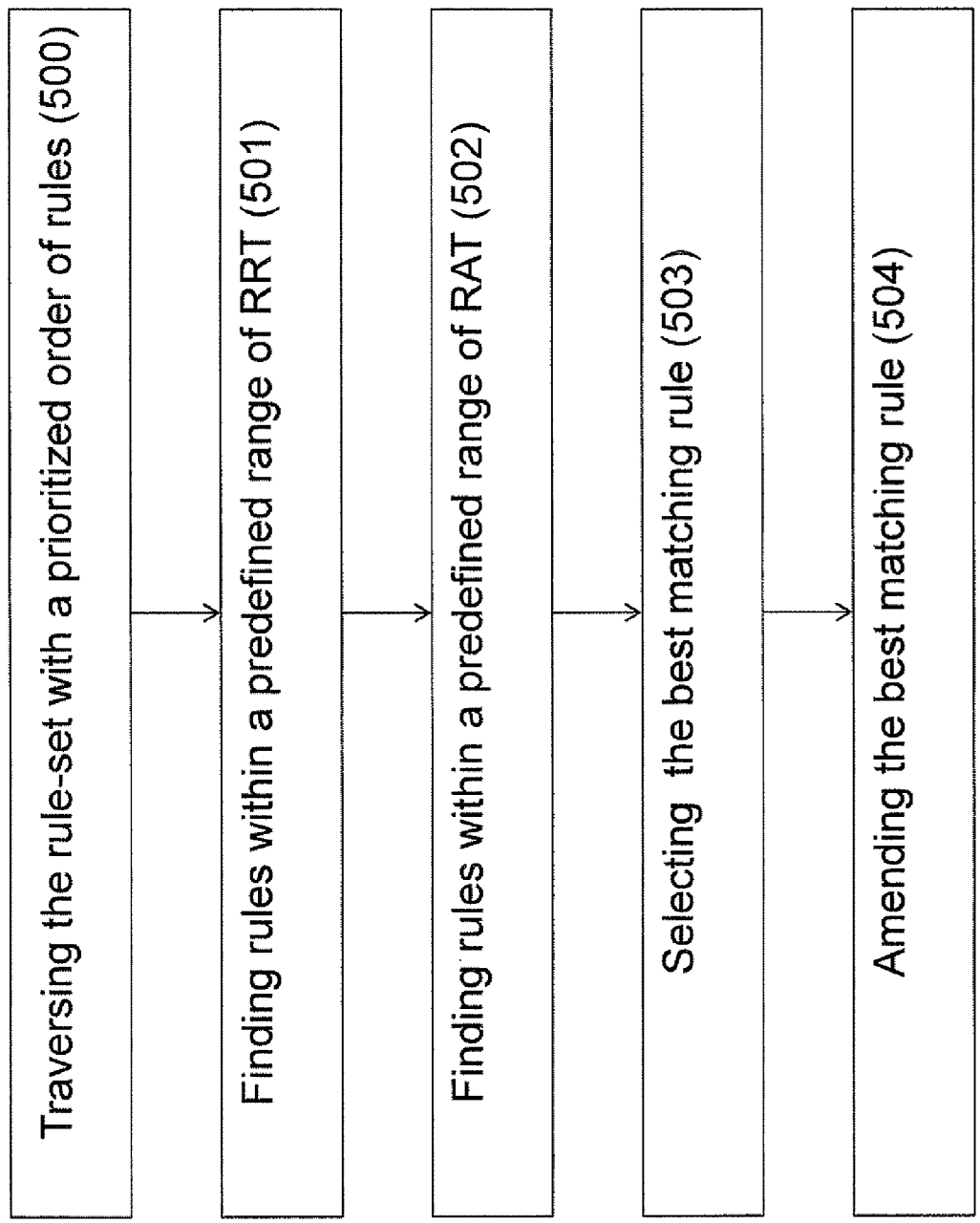
FIG. 5 illustrates a generalized flow diagram of automated generation of exemplified rule-set amending in accordance with certain embodiments of the present invention.

Referring to FIG. 5, there is illustrated a generalized flow diagram of an exemplified automated amending initial rule-set related to a given security gateway engaged in a connectivity request.

In a case of a rule-set with a prioritized order of rules (referred to hereinafter as an ordered rule-set), the necessary amendment may be provided by adding at a top of the rule-set a new rule generated in accordance with a connectivity request and allowing the required access. However, such an approach may result in a rule-set that is too big, too difficult to manage and inefficient to enforce. Moreover, such an approach would cause security problems as the newly added rule would shadow rules that block dangerous traffic (e.g. the stealth rule protecting the security gateway itself by dropping all connections destined to the security gateway).

In accordance with certain embodiments of the present invention, generating amendment for an ordered rule-set shall preferably include finding an existing rule that can be amended to allow the new required access. Such a rule shall be determined and amended in accordance with following criteria: minimized resulting extra allowed traffic and/or minimized requested traffic restricted because of shadowing.

In accordance with certain embodiments of the present invention the criterion of minimized resulting extra traffic may be characterized by a minimized ratio of added traffic (RAT), and criterion of minimized requested traffic restricted because of shadowing may be characterized by a minimized ratio of rejected traffic (RRT).

Figure 6:
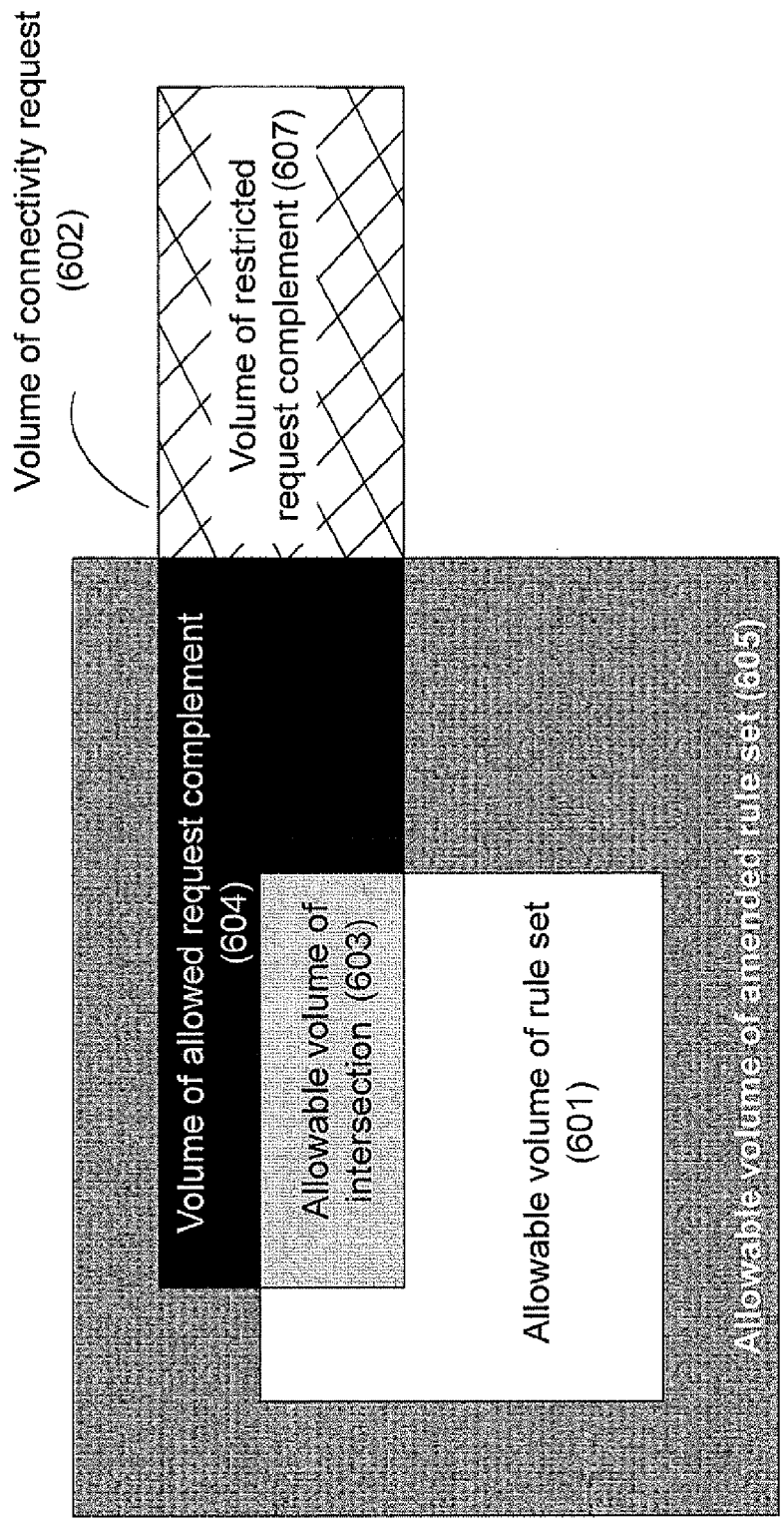
FIG. 6 schematically illustrates the relationship between allowed traffic in the initial rule-sets, an unfitting connectivity request and allowed traffic in the amended rule-set.

FIG. 6 schematically illustrates the relationship between allowed traffic in the initial rule-set, allowed traffic in the amended rule-set and an unfitting connectivity request. A square 601 represents a set of allowable values of a given initial rule-set. Values specified in the fields (e.g. addresses and services) are referred to hereinafter as "allowable" if they are connected by an allowance condition and not shadowed by previous rules, (e.g. previous rule should not perform contradicting actions on the required connectivity). The set 601 is characterized by volume $V_1$ which is calculated over the initial rule-set and characterizes a number of allowable combinations. By way of non-limiting example, rule-set allowable volume may be calculated as following:

a) Calculate un-shadowed volume for each permissive rule in the rule-set. This volume may be calculated by summing/counting the number of unique connections available in the rule, that do not exist in previous rules, i.e. the number of unique combinations of the form "Src Ip×Dst Ip×Service", that will be matched to the given rule.

a) Calculate rule-set allowable volume by accumulating un-shadowed volume for each individual permissive rule.

Likewise there may be defined an allowable volume $V_5$ characterizing amended rule-set illustrated as a square 605. A square 602 represents a set of values specified in a given unfitting connectivity request. The request is characterized by volume $V_2$ which characterizes a number of requested combinations and may be, by way of non-limiting example, calculated as a multiplication of a number of IP addresses in a source field with a number of allowable IP addresses in a destination field and a number of services in a service field of the connectivity request. The illustrated square 602 comprises 3 parts:

1) Gray part 603 (characterized by volume $V_3$) representing an intersection of sets 601 and 602, i.e. a part of connectivity request allowed in the initial rule set;
2) Black part 604 (characterized by volume $V_4$) representing a complement of the set 602 relative to set 601 whilst intersection of sets 602 and 605, i.e. a part of connectivity request allowed in the amended rule-set;
3) Crossed part 607 (characterized by volume $V_7$) representing a complement of set 602 relative to set 605, i.e. a part of connectivity request restricted in the amended rule-set because of shadowing or other reasons.

Complement (characterized by volume $V_6$) of amended set of allowable values relative to initial set 601 is illustrated as a union of the textured part of the square 605 and the black part 604 of the square 602.

Those versed in the art will readily appreciate that sizes of volumes $V_3$, $V_4$ and $V_7$ (including cases when one or two volumes are equal to zero) depend on relationship between the connectivity request, the initial rule-set and shadowing therein resulting from rule overlapping.

By way of non-limiting example, the ratio of added traffic may be calculated as $RAT=V_5/V_1$ and may, accordingly, characterize a relation between allowed traffic in the amended rule set and traffic allowed in the initial rule-set, By way of another non-limiting example, the ratio of added traffic may be calculated as $RAT=V_6/V_4$ and may, accordingly, characterize a relation between entire added traffic and traffic which needs to be added in accordance with the connectivity request. In these examples the minimal RAT=1.

By way of non-limiting example, the ratio of rejected traffic may be calculated as $RRT=V_7/V_4$ and accordingly, may characterize a relation between requested traffic rejected resulting from amendment and requested traffic allowed resulting from amendment. By way of another non-limiting example, the ratio of rejected traffic may be calculated as $RRT=V_7/V_2$ and accordingly, may characterize a relation between requested traffic rejected resulting from amendment and entire requested traffic. In these examples the minimal RRT=0.

Referring back to FIG. 5, the rule-set manager traverses (500) the respective rule-set in order to find a permissive rule best matching to a given connectivity request.

In accordance with certain embodiment of the present invention, the rule is considered as best matching if it fits criteria of minimized resulting extra allowed traffic and/or minimized requested traffic restricted because of shadowing (e.g. minimal RAT, or minimal RRT, or minimal $RAT^2+RRT^2$ or other combination thereof).

Accordingly, the rule-set manager searches for rules enabling a predefined range of RRT (501) and RAT (502), and selects (503) the best matching rule among them. Alternatively, the rule-set manager may search for rules with minimal RRT, for rules with minimal RAT (which are not necessary the same rules) and select best matching rules among them. Those versed of the art will readily appreciate that operations 501-502 may be provided in opposite sequence or in parallel or one of them may be omitted depending on selection of criterion for best matching.

The best matching rule (or one of multiple best matching rules) is further amended (504) to allow the connectivity request. Optionally, the rule-set manager may be configured to provide automatic verification of provided amendments to ensure that they fit predefined thresholds for RAT and/or RRT.

Optionally, the rule set manager may be configured to present rules fitting predefined criterion (e.g. with RAT and/or RRT within a certain range) to an administrator for manual selection of the rule to be selected as the best matching rule.

The rule-set manager may be further configured to add (or to propose to add) a new rule for amending the initial rule-set, if no rules has been found fitting thresholds for RAT criterion.

By way of non-limiting example, searching the rule with the minimal RAT may be provided as following a sequence of operations:
1) for each permissive rules in the rule-set:
   a. uniting the sets of values specified in the rule and in the connectivity request and
   b. calculating RAT as a ratio of resulted and initial allowable volumes characterizing the rule, i.e. $RAT=V_5/V_1$; (as in this non-limiting example $V_1$ is equal for all rules, RAT may be defined as $RAT=V_5$)
2) selecting one or more rules enabling the RAT less than a predefined threshold.

Alternatively or additionally, search for best matching rule may be provided in accordance with criterion of minimized rejection of requested access because of shadowing the amending rules by the rules above (e.g. minimal RRT which may be calculated similar to minimal RAT calculations). Maximal allowed value of RRT characterizes the lowest location of the best matching rule. If the rule is placed lower, the connectivity will be too shadowed. If, for example, a user has specified that the connectivity request shall be fully allowed, RRT shall be equal to zero.

Optionally, the rule-set manager may be configured to allow an administrator to select certain rules (e.g. certain security and/or business continuity rules), that should never be violated, and, accordingly, cannot be shadowed by a permissive rule. Hence these rules characterize the highest location of the best matching rule(s). Also such rules will be eliminated from RAT calculations when searching the best matching rule.

These lowest and the highest locations may be used as constrains for the entire search or parts thereof. For example, in the flow chart illustrated in FIG. 5, the best matching rules may be searched within the range defined by the lowest and/or the highest location. Alternatively, a rule at the highest or lowest location may be defined as a best matching rule without any search in accordance with minimal RAT or RRT criteria.

Alternatively or additionally to RAT criterion based search, the search for best matching rule may be provided in accordance with best matching of rule syntax with the syntax of connectivity request. For example, a given permissive rule may be considered as syntax-matching if it meets all of the following conditions:
- the rule and the request have the same engaged fields;
- sets of values specified in all fields except one and the satisfying conditions specified in the rule are equal to the respective sets of values specified in respective fields of the connectivity request;
- set of values specified in excepted one other field of the connectivity request comprises at least one value which is not specified in the respective set in the rule.

If the initial rule-set comprises several rules with syntax match, the rule-set manager may automatically select the rule enabling the minimal $RAT=V_6/V_4$ (or $RAT=V_4/V_3$ or otherwise calculated additional RAT).

Non-limited examples of best matching rules and their amendments are illustrated in Tables 1-3.

TABLE 1

| Rule number | Source | Destination | Service | Action |
|---|---|---|---|---|
| Original Rule base | | | | |
| 1 (best matching rule) | a | b | c | Accept |
| 2 | Any | Any | Any | Drop |
| Connectivity Request | | | | |
| Connectivity Request | a | b | d | Accept |
| Amended Rule base | | | | |
| 1 | a | b | c, d | Accept |
| 2 | Any | Any | Any | Drop |

The amendment illustrated in Table 1 enables all requested traffic with no not-requested extra traffic (perfect match).

TABLE 2

| Rule number | Source | Destination | Service | Action |
|---|---|---|---|---|
| Original Rule base | | | | |
| 1 | Any | Firewall | Any | Drop |
| 2 (best matching rule) | Any | Internet | http | Accept |
| 3 | Any | Any | Any | Drop |
| Connectivity Request | | | | |
| Connectivity Request | Any | Internet | ftp | Accept |
| Amended Rule base | | | | |
| 1 | Any | Firewall | Any | Drop |
| 2 | Any | Internet | http, ftp | Accept |
| 3 | Any | Any | Any | Drop |

The amendment illustrated in Table 2 enables part of requested traffic with no not-requested extra traffic; some of the required traffic is shadowed by upper rule).

TABLE 3

| Rule number | Source | Destination | Service | Action |
|---|---|---|---|---|
| Original Rule base | | | | |
| 1 (best matching rule) | Host1 | Host2, Host3 | ssh, telnet | Accept |
| 2 | Any | Any | Any | Drop |
| Connectivity Request | | | | |
| Connectivity Request | Host1 | Host2 | scp | Accept |
| Amended Rule base | | | | |
| 1 | Host1 | Host2, Host3 | ssh, telnet, scp | Accept |
| 2 | Any | Any | Any | Drop |

The amendment illustrated in Table 3 enables all requested traffic, however results in extra-allowed traffic non-compulsory for the given connectivity request.

After selecting the rule to modify, the rule-set manager may continue to implement object modifications or provide object modification instructions. For example, if an IP needs to be added to source and a suitable host already exists, the manager can instruct to use this object, otherwise, it can instruct to create such an object and, potentially, add it to an object group that appears in the rule.

Optionally, the rule-set manager may be further configured to select two or more rules fitting predefined criteria (e.g. certain range of RAT and/or certain range of RRT) and to decide on the best fitting rule among said selected rules in accordance with at least one of the following criteria:

1) Minimizing the required change, for example:
   If the allowance of the unfitting connectivity request can be achieved by changing a single rule, this is preferred to as multiple rule changes;
   If the allowance of the unfitting connectivity request can be achieved by changing a single field (for example Source), this is preferred to multiple field changes;
   Object changes are preferred to rule changes or vice versa;
2) User preferences, for example: "the change must be performed in a certain rule base section"
3) Simplicity of resulting configuration, for example:
   Minimize the number of rules,
   Minimize the number of objects (users, networks, services etc.),
   Minimize the number of objects participating in rule fields,
   Minimize shadowing;
4) User preferences, for example:
   The change should be performed in a certain rule base section,
   The change must be performed in rules matching certain criteria (name, format, comment format etc.);
5) Rule base characteristics, for example:
   Rule base grouping by certain fields should be preserved,
   Usage of network groups is allowed or prohibited,
   Minimal or maximal allowed network size,
   Maximum number of rules in a certain section;
6) Performance considerations, for example:
   Avoid adding a rarely used connection to a heavily used rule and vice versa;
7) Generalization, for example:
   Allow providing extra connectivity beyond the request when certain criteria are met (when a network can replace several nodes etc.);
8) Best practices, for example:
   Avoiding bidirectional rules for client-server protocols.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of automated managing an ordered set of security rules implemented at one or more security gateways, the method comprising:
   a. obtaining data characterizing a connectivity request which may become allowable only upon changes of an initial rule-set, thus giving rise to an unfitting connectivity request;
   b. automated searching for a rule within said ordered set of security rules, said rule best matching to be amended in order to facilitate allowance of the unfitting connectivity request, wherein best matching is defined in accordance with one or more predefined criteria;
   c. automated generating amendment of the best matching rule, said amendment capable to facilitate allowance of the unfitting connectivity request; and
   d. automated implementing the generated amendment at one or more relevant security gateways among said one or more security gateways, thus giving rise to an amended rule-set.

2. The method of claim 1 wherein at least one predefined criterion is related to extra allowed traffic resulting from the amendment.

3. The method of claim 1 wherein at least one predefined criterion is related to requested traffic restricted after amendment by one or more rules above the amended rule.

4. The method of claim 1 wherein at least one predefined criterion characterizes a relation between allowed traffic in the amended rule-set and traffic allowed in the initial rule-set.

5. The method of claim 1 wherein at least one predefined criterion characterizes a relation between entire added traffic and traffic which needs to be added in accordance with the unfitting connectivity request.

6. The method of claim 1 wherein at least one predefined criterion characterizes a relation between requested traffic rejected resulting from amendment and requested traffic allowed resulting from amendment.

7. The method of claim 1 wherein at least one predefined criterion characterizes a relation between requested traffic rejected resulting from amendment and entire requested traffic.

8. The method of claim 1 wherein at least one predefined criterion is selected from a group comprising:
   a. criterion characterizing a relation between allowed traffic in the amended rule-set and traffic allowed in the initial rule-set;
   b. criterion characterizing a relation between entire added traffic and traffic which needs to be added in accordance with the unfitting connectivity request;
   c. criterion characterizing a relation between requested traffic rejected resulting from amendment and requested traffic allowed resulting from amendment;
   d. criterion characterizing a relation between requested traffic rejected resulting from amendment and entire requested traffic;
and wherein the rule is considered as best matching if it fits at least one of said criteria and/or combination thereof.

9. The method of claim 8 further comprising automated searching for a plurality of rules enabling a predefined range of at least one of said criteria, and selecting the best matching rule among them.

10. The method of claim 8 further comprising automated searching, for each said criterion, at least one rule enabling the minimal value of respective criterion, and selecting the best matching rules among them.

11. The method of claim 1 wherein searching for the best matching rule comprises selecting a plurality of rules matching certain predefined conditions, and enabling a user to select the best matching rule among said plurality of rules.

12. The method of claim 1 further comprising presenting the generated amendment to a user for approval prior to implementing said amendment.

13. The method of claim 1 further comprising validating the generated amendment prior to implementing.

14. The method of claim 1 further comprising:
   a. obtaining a plurality of unfitting connectivity requests,
   b. generating respective amendments to each request among said plurality of unfitting connectivity requests,
   c. queuing the generated amendments; and
   d. implementing the generated amendments during a certain service window.

15. The method of claim 1 wherein implementing the generated amendment further comprises:
   a. analyzing routing tables of the security gateways;
   b. generating ranking the security gateways in accordance with their relevance to the unfitting connectivity request,
   c. selecting one or more security gateways with the highest ranking; and
   d. implementing the configuration change at the selected security gateways.

16. A computer program embodied on a non-transitory computer readable medium comprising computer program code means for performing all the steps of claim 1 when said program is run on a computer.

17. A system capable of automated managing an ordered set of security rules implemented at one or more security gateways, the system comprising:
   a. means for obtaining data characterizing a connectivity request which may become allowable only upon changes of an initial rule-set, thus giving rise to an unfitting connectivity request;
   b. means for automated searching for a rule within said ordered set of security rules, said rule best matching to be amended in order to facilitate allowance of the unfitting connectivity request, wherein best matching is defined in accordance with one or more predefined criteria;
   c. means for automated generating amendment of the best matching rule, said amendment capable to facilitate allowance of the unfitting connectivity request; and
   d. means for automated implementing the generated amendment at one or more relevant security gateways among said one or more security gateways, thus giving rise to an amended rule-set.

18. The system of claim 17 wherein at least one predefined criterion is related to extra allowed traffic resulting from the amendment.

19. The system of claim 17 wherein at least one predefined criterion is related to requested traffic restricted after amendment because of shadowing by one or more rules above the amended rule.

20. The system of claim 17 wherein at least one predefined criterion is selected from a group comprising:
   a. criterion characterizing a relation between allowed traffic in the amended rule-set and traffic allowed in the initial rule-set;
   b. criterion characterizing a relation between entire added traffic and traffic which needs to be added in accordance with the unfitting connectivity request;
   c. criterion characterizing a relation between requested traffic rejected resulting from amendment and requested traffic allowed resulting from amendment;
   d. criterion characterizing a relation between requested traffic rejected resulting grom amendment and entire requested traffic;

wherein the rule is considered as best matching if it fits at least one of said criteria and/or combination thereof.

21. The system of claim 20 further comprising automated searching for a plurality of rules enabling a predefined range of at least one of said criteria, and selecting the best matching rule among them.

22. The system of claim 20 further comprising automated searching, for each said criterion, at least one rule enabling the minimal value of respective criterion, and selecting the best matching rule among them.

23. The system of claim 17 further comprising means for selecting a plurality of rules matching certain predefined conditions, means for enabling a user to select the best matching rule among said plurality of rules.

24. The system of claim 17 further comprising means for presenting the generated amendment to a user for approval prior to implementing said amendment.

* * * * *